United States Patent [19]

Tada et al.

[11] Patent Number: 5,363,034
[45] Date of Patent: Nov. 8, 1994

[54] POSITION DETECTOR WITH MAGNETIC SCALE AND MAGNETIC SENSOR THAT HAS MAGNETIC RELUCTANCE ELEMENTS IN NON-OVERLAPPING RELATIONSHIP

[75] Inventors: Junichi Tada; Takamoto Yoshioka, both of Kanagawa, Japan

[73] Assignee: Sony Magnescale, Inc., Tokyo, Japan

[21] Appl. No.: 811,151

[22] Filed: Jun. 4, 1991

[30] Foreign Application Priority Data

Jun. 8, 1990 [JP] Japan ................... 2-150688

[51] Int. Cl.[5] .............. G01B 7/14; G01P 3/42
[52] U.S. Cl. .............. 324/207.21; 324/207.24; 324/207.25; 338/32 R
[58] Field of Search .............. 324/207.21, 207.24, 324/207.25, 235, 252; 338/32 R

[56] References Cited

U.S. PATENT DOCUMENTS 5,216,363 6/1993 Masaahi .................. 324/207.21

Primary Examiner—Walter E. Snow
Attorney, Agent, or Firm—Jay H. Maioli

[57] ABSTRACT

A position detecting apparatus is comprised of a magnetic scale formed by sequentially disposing magnets at a lattice pitch $\lambda$, and a magnetic sensor disposed in an opposing relation to the magnetic scale so as to become relatively movable to each other, wherein the magnetic sensor includes a plurality of magnetic sensor elements, each having first and second magnetic reluctance elements, the first and second magnetic reluctance elements are spaced apart from each other by $1/6\lambda$ in the direction in which the magnets are disposed and connected in series, and the first and second magnetic reluctance elements are disposed so as not to overlap each other as seen from the direction parallel to the direction in which the magnets are disposed.

4 Claims, 9 Drawing Sheets

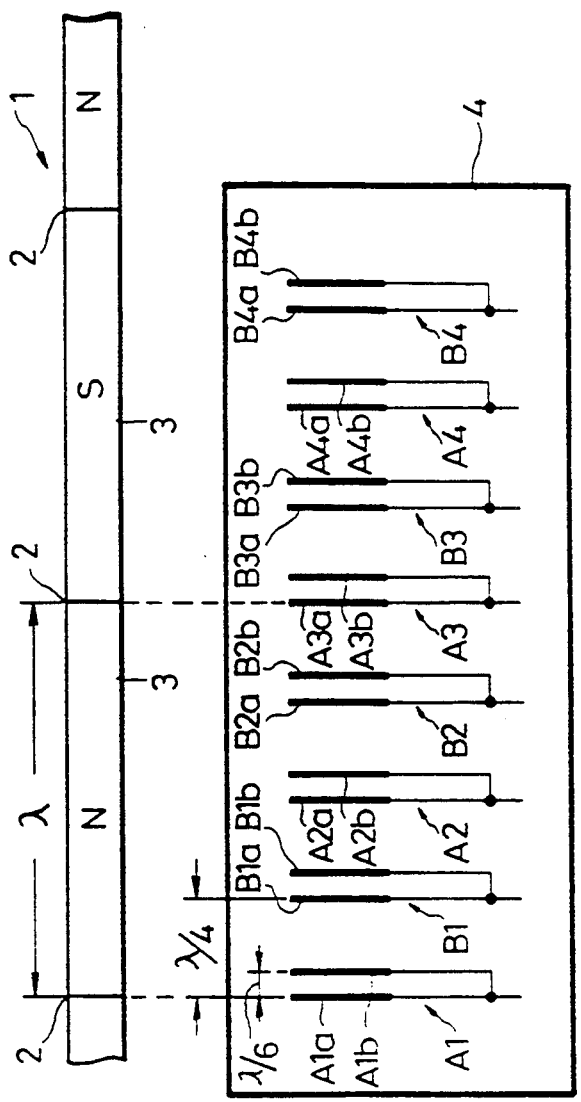
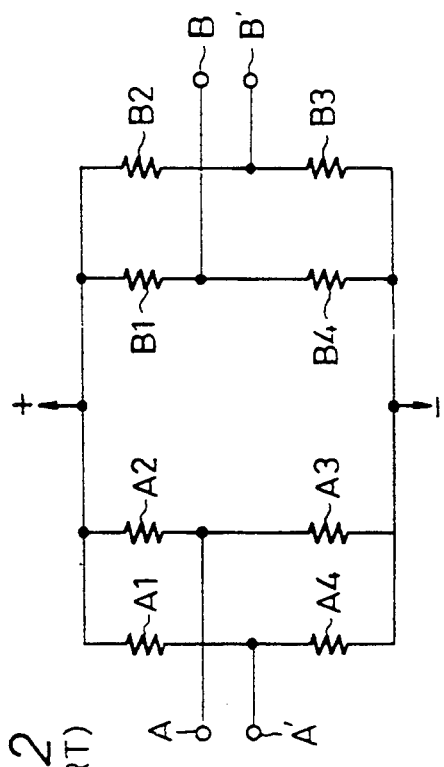
FIG. 1A (PRIOR ART)
FIG. 1B (PRIOR ART)
FIG. 2 (PRIOR ART)

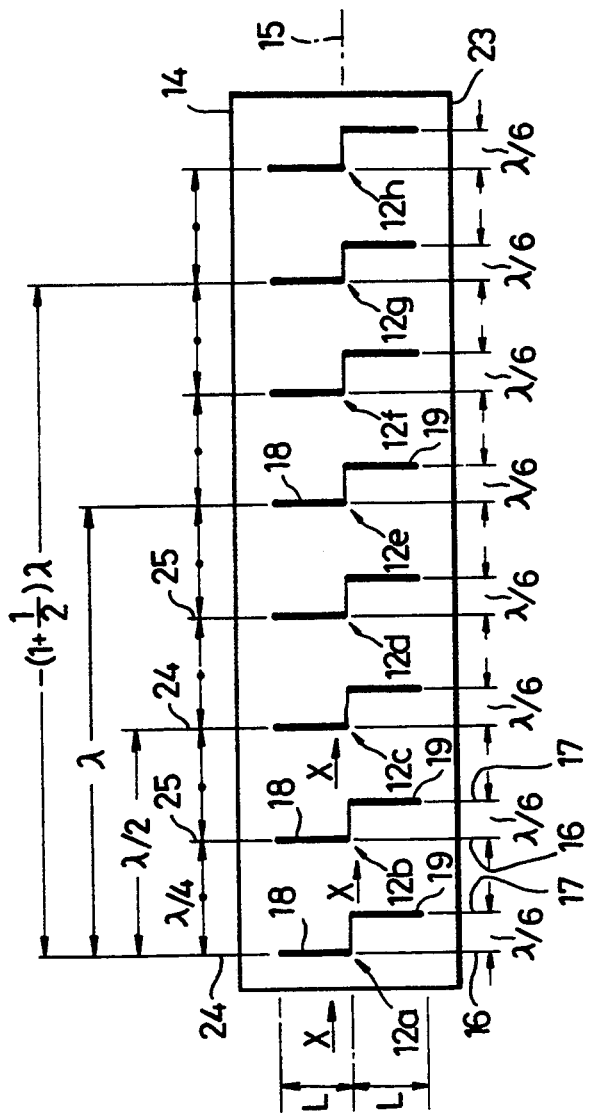
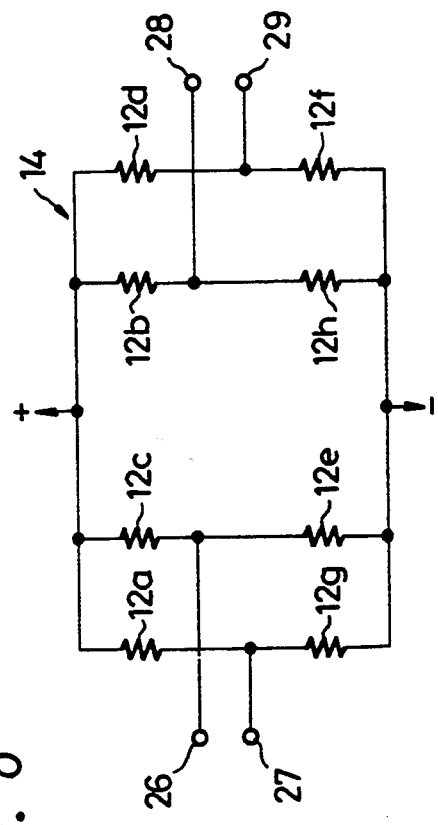
FIG. 7
FIG. 8

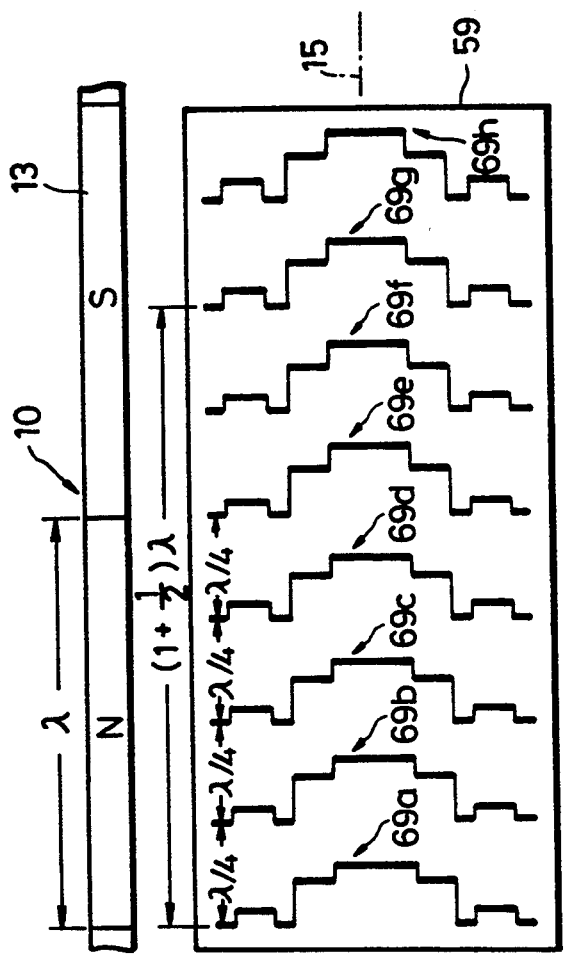
FIG. 13A
FIG. 13B
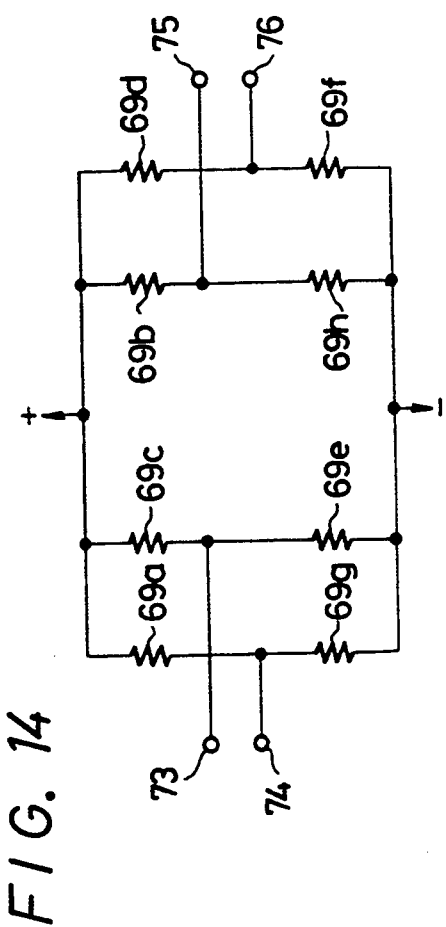
FIG. 14

POSITION DETECTOR WITH MAGNETIC SCALE AND MAGNETIC SENSOR THAT HAS MAGNETIC RELUCTANCE ELEMENTS IN NON-OVERLAPPING RELATIONSHIP

BACKGROUND OF THE INVENTION

1. Field of the Invention

The present invention generally relates to position detecting apparatus and, more particularly, is directed to a position detecting apparatus utilizing magnetic reluctance elements to detect a position or the like of a magnetized scale such as a magnetized rotor or a magnetized scale or the like.

2. Description of the Prior Art

It is known that a detected signal from a position detecting apparatus having a magnetic reluctance element contains a harmonic component other than a fundamental wave component. To remove such harmonic component, it is proposed to provide a constant clearance between the magnetic scale and the position detecting apparatus. According to this proposal, the harmonic component cannot be removed sufficiently. Also, mechanical position accuracy of the apparatus must be increased in order to set the constant clearance between the magnetic scale and the position detecting apparatus and the constant clearance cannot be set without difficulty.

According to the prior art, a pattern layout of the magnetic reluctance element lines is set so as to make the length of the magnetic reluctance line substantially equal to the wavelength of the harmonic component, thereby a detected signal considerably approximated to a sine wave, which is the fundamental wave, being produced from the position detecting apparatus.

FIGS. 1A, 1B, FIG. 2 and FIGS. 3A, 3B illustrate examples of position detecting apparatus according to the prior art, respectively.

FIG. 1A shows a magnetized scale 1, and as shown in FIG. 1A, the magnetized scale 1 is formed by sequentially providing a plurality of magnets 3 at a lattice pitch $\lambda$ to form lattices 2, 2. FIG. 1B shows a magnetic sensor 4 having a predetermined magnetic reluctance element pattern, that is, a strip-shaped pattern. In the magnetic sensor 4, magnetic reluctance elements A1, A2, ... A4 and magnetic reluctance elements B1, B2, ... B4 are respectively aligned with an interval of $\lambda/4$ therebetween magnetic reluctance element members A1$a$, A2$a$, ... A4$a$ and magnetic reluctance element members A1$b$, A2$b$, ... A4$b$ forming the magnetic reluctance elements A1, A2, ... A4 are aligned with an interval of $\lambda/6$ therebetween. Also, a magnetic reluctance element members B1$a$, B2$a$, ... B4$a$ and a magnetic reluctance element members B1$b$, B2$b$, ... B4$b$ forming the magnetic reluctance elements B1, B2, ... B4 are aligned with an interval of $\lambda/6$.

If a voltage is applied to the thus arranged magnetic sensor 4 in the polarities (+) and (−) shown in FIG. 2 and if differential amplifiers (not shown) are respectively connected to output terminals A, A' and B, B', then the differential amplifiers derive detected signals of phases A and B. In that case, since the magnetic reluctance elements having the pitch $\lambda/6$ and the magnetic reluctance elements having the pitch $(n+\frac{1}{2})\lambda$ are formed in the magnetic sensor 4, the magnetic sensor 4 derives detected signals from which an even-numbered order harmonic component and a ternary harmonic component are removed.

FIG. 3A shows the same magnetized scale 1 as that of FIG. 1A. FIG. 3B shows a magnetic sensor 5 having other predetermined magnetic reluctance element pattern, that is, a so-called folded pattern. In this magnetic sensor 5, two folded patterns 6, each being formed in $19\lambda/3$, are formed in the longitudinal direction of the magnetized scale 1 with an interval of $22\lambda/24$ therebetween. A dotted portion shown in FIG. 3 illustrates a conductor portion 7 formed by a thin film forming technique.

When the voltage is applied to the thus constructed magnetic sensor 5 in the polarities of (+) and (−) of FIG. 3B, output signals expressed by the following equations (1) and (2) are developed at output terminals E and G so that even-numbered order harmonic component and the ternary harmonic component can be removed from the detected signals. In the following equations (1) and (2), a distortion component is removed in order to more clearly understand the principle of this magnetic sensor 5.

$$\text{SIN}\theta + \text{SIN}(\theta + 60) \qquad (1)$$

$$\text{COS}\theta + \text{COS}(\theta + 60) \qquad (2)$$

In this way, the even-numbered order harmonic component and the ternary harmonic component can be removed from the detected signals. In this case, if the folded pattern is modified, then odd-numbered order harmonic components exceeding the ternary harmonic component can be removed from the detected signals as will be described later.

In the position detecting apparatus having the magnetic sensors 4 and 5 shown in FIGS. 1B and 3B, however, if the magnetic scale to be detected thereby is a magnetized rotor 8 provided as a rotary encoder and which is rotated in the direction shown by an arrow AW in FIG. 4, then a clearance S1 between the central portion of the magnetic sensor 4 or 5 in the tangential direction of the circumferential portion of the magnetized rotor 8 and the rotor 8 and a clearance S2 between the end portion of the sensor 4 or 5 and the rotor 8 become different from each other. As a consequence, the amplitude of the detected signal is fluctuated so that, in actual practice, this magnetic sensor cannot be utilized as the position detecting apparatus.

Further, even though the magnetic scale is the magnetized scale 1 provided as the linear encoder, the length of the magnetized scale 1 with the slit-like pattern and the folded pattern in its length direction is relatively increased so that clearances S3 and S4 between respective ends of the magnetic sensor 4 or 5 and the scale 1 in the longitudinal direction of the magnetized scale 1 become different in value. Also in this case, the amplitude of the detected signal is fluctuated. Accordingly, in order to remove the above disadvantages, the mechanical position accuracy of the position detecting apparatus must be increased.

Furthermore, in the slit-shaped pattern shown in FIG. 1B, the magnetic reluctance element members A1$b$ to A4$b$ and the magnetic reluctance element members B1$b$ to B4$b$ must be aligned in parallel to the magnetic reluctance element members A1$a$ to A4$a$ and the magnetic reluctance element members B1$a$ to B4$a$ with a phase displacement of $\lambda/6$ in order to cancel the ternary harmonic component so that, when the lattice pitch λ of the magnetized scale 1 is reduced, then the space of the phase displacement of λ/6 also is reduced, causing mutual interference between the adjacent magnetic reluctance element members, which produces a new harmonic component distortion in the detected signal. Moreover, when the lattice pitch λ is further reduced, the magnetic reluctance element members A1b to A4b and the magnetic reluctance element members B1b to B4b which are displaced in phase by λ/6 cannot be inserted into the pattern from a physics standpoint. Similarly, the magnetic reluctance element patterns displaced in phase by λ/10 cannot be newly inserted into the magnetic sensor in order to cancel a quinary harmonic component.

On the other hand, in the folded pattern shown in FIG. 3B, if the clearances of the adjacent folded patterns 6 relative to the magnetized scale 1 are different as described with reference to FIG. 5, then an amplitude difference occurs between the detected signals, which causes a measurement error. For this reason, it is preferable that the folded pattern can be suppressed from being extended in the longitudinal direction of the magnetized scale 1 as much as possible. However, when a quinary harmonic component is removed in addition, for example, to the removal of the ternary harmonic component, a new folded pattern must be provided additionally, which unavoidably makes the distance between the folded patterns longer.

OBJECTS AND SUMMARY OF THE INVENTION

Accordingly, it is an object of the present invention to provide an improved position detecting apparatus in which the aforementioned shortcomings and disadvantages encountered with the prior art can be eliminated.

More specifically, it is an object of the present invention to provide a position detecting apparatus in which a folded pattern can be relatively suppressed from being extended in the direction in which a magnetic scale is disposed.

It is another object of the present invention to provide a position detecting apparatus which can remove an even-numbered order harmonic component and an odd-numbered order harmonic component.

It is a further object of the present invention to provide a position detecting apparatus which can be miniaturized.

As a first aspect of the present invention, a position detecting apparatus is comprised of a magnetic scale formed by sequentially disposing magnets at a lattice pitch λ, and a magnetic sensor disposed in an opposing relation to the magnetic scale so as to become relatively movable to each other, wherein the magnetic sensor includes a plurality of magnetic sensor elements, each having first and second magnetic reluctance elements, the first and second magnetic reluctance elements are spaced apart from each other by λ/6 in the direction in which the magnets are disposed and connected in series, and the first and second magnetic reluctance elements are disposed so as not to overlap each other as seen from the direction parallel to the direction in which the magnets are disposed.

In accordance with a second aspect of the present invention, a position detecting apparatus is comprised of a magnetic scale formed by sequentially disposing magnets at a lattice pitch λ, and a magnetic sensor disposed in an opposing relation to the magnetic scale so as to become relatively movable to each other, wherein the magnetic sensor includes a plurality of magnetic sensor elements, each having first to fourth magnetic reluctance elements, the second to fourth magnetic reluctance elements are respectively spaced apart by λ/10, λ/6 and 4λ/15 from the first magnetic reluctance elements and connected in series and the first to fourth magnetic reluctance elements are disposed so as not to overlap each other as seen from the direction parallel to the direction in which the magnets are disposed.

The above and other objects, features, and advantages of the present invention will become apparent from the following detailed description of preferred embodiments thereof to be read in conjunction with the accompanying drawings, in which like reference numerals are used to identify the same or similar parts in the several views.

BRIEF DESCRIPTION OF THE DRAWINGS

FIGS. 1A, 1B, 2, 3A, 3B, 4 and 5 are schematic diagrams used to explain arrangements and operations of position detecting apparatus according to the prior art, respectively;

FIG. 7 is a plan view of the position detecting apparatus shown in FIG. 6;

FIG. 8 is a diagram showing a circuit arrangement of the position detecting apparatus shown in FIGS. 6 and 7;

FIG. 11 is a perspective view used to explain how the position detecting apparatus of the invention is operated against the fluctuation of the rolling direction or the like;

FIG. 13A is a plan view of a magnetized scale;

FIG. 13B is a plan view of the fourth embodiment of the position detecting apparatus according to the present invention;

FIG. 14 is a diagram showing a circuit arrangement of the position detecting apparatus shown in FIG. 13B.

DETAILED DESCRIPTION OF THE PREFERRED EMBODIMENTS

Figures 3A, 3B:
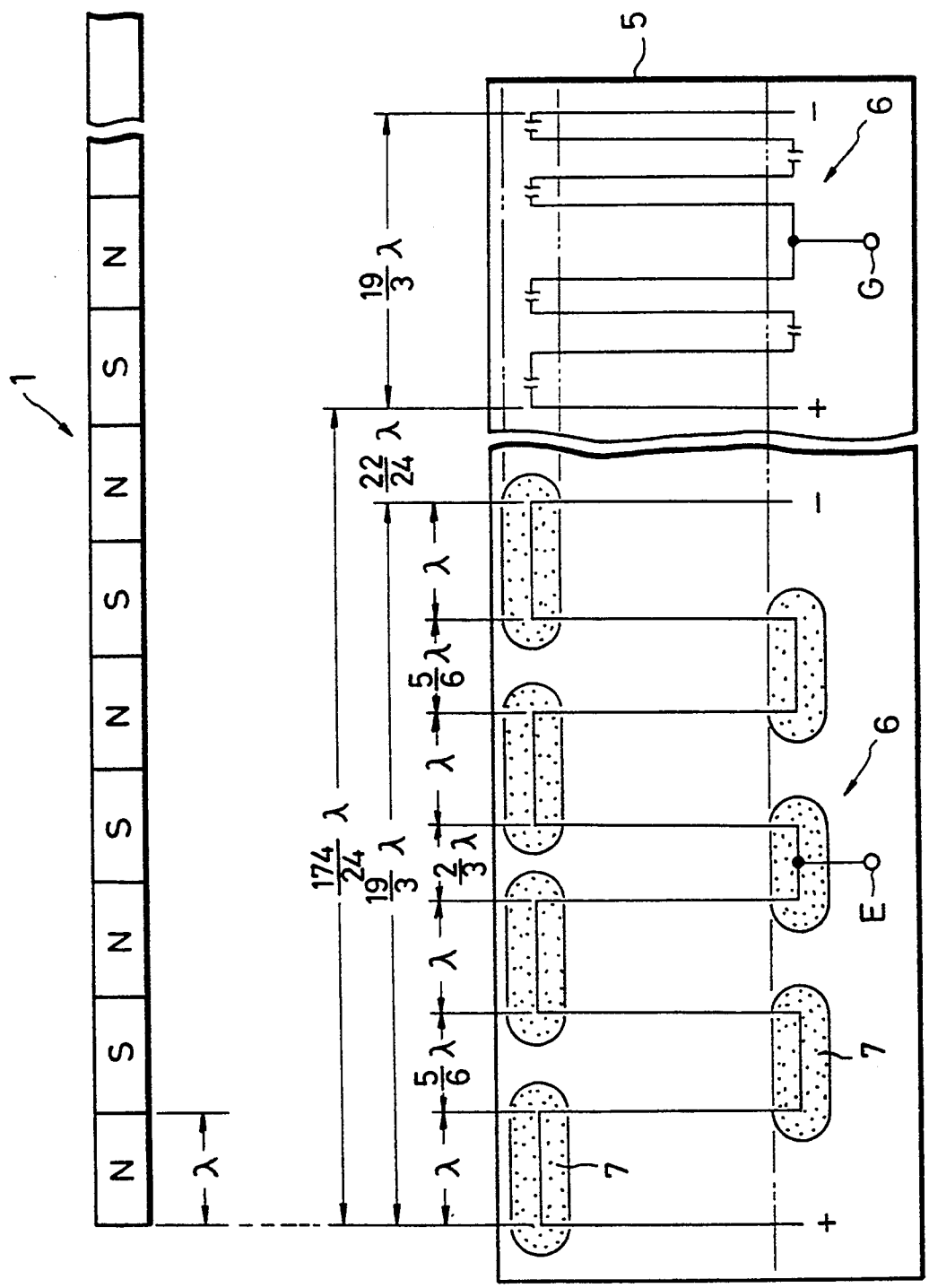
Figure 4:
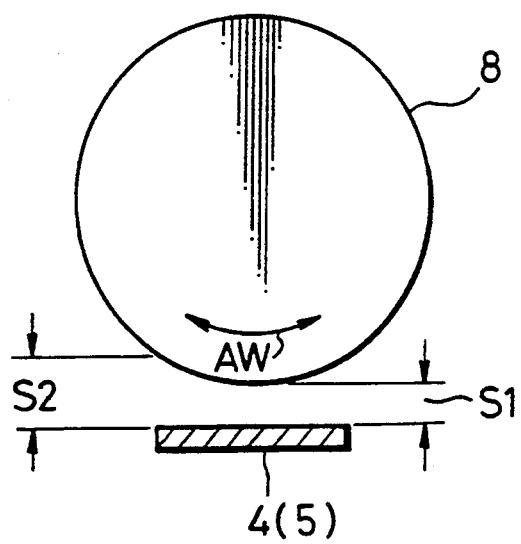
Figure 5:
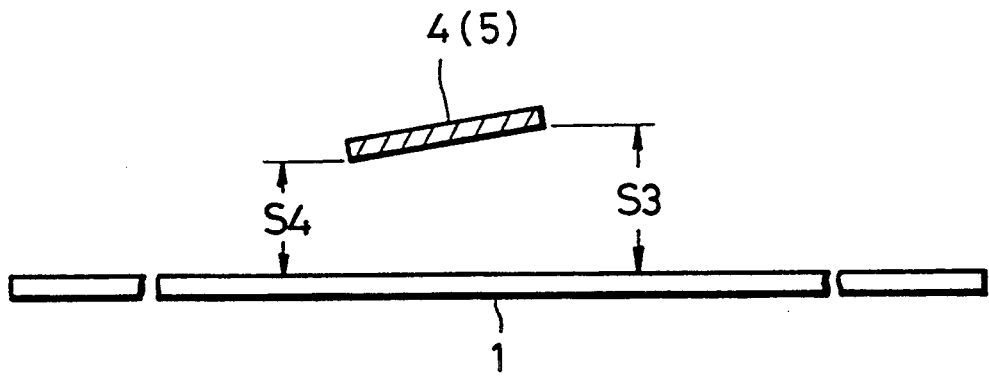

Referring to the drawings in detail and, initially to FIGS. 6 and 7, a first embodiment of the position detecting apparatus according to the present invention will be described hereinafter.

Figure 6:
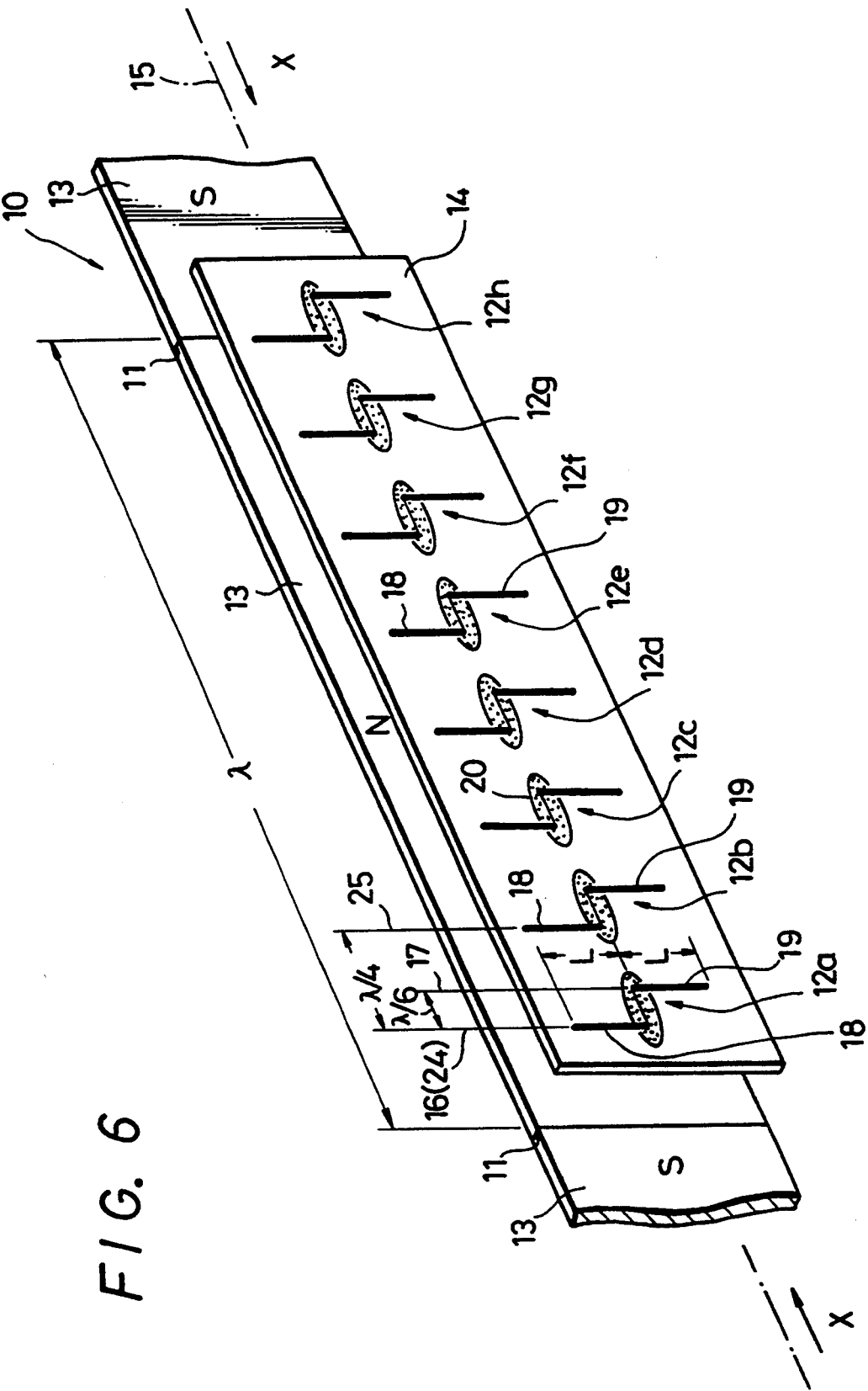
FIG. 6 is a perspective view illustrating an arrangement of a first embodiment of the position detecting apparatus according to the present invention.

Referring to FIGS. 6 and 7, there is shown a magnetized scale 10 which is provided as the magnetic scale. The magnetized scale 10 has a lattice pitch λ and is formed by sequentially disposing a plurality of magnets 13, each being disposed between lattices 11 and 11, in such a manner that N poles and S poles are alternately formed.

A magnetic sensor 14 includes a plurality of magnetic sensor elements 12a to 12h, each having a predetermined magnetic reluctance element pattern, that is, a pattern of so-called crank configuration. The magnetic sensor 14 is located in the vicinity of the magnetized scale 10 in an opposing relation so as to become movable relatively to the magnetic scale 10, thereby forming the position detecting apparatus for detecting the position or speed. Each of the magnetic sensor elements 12a to 12h includes first and second magnetic reluctance elements 18, 19 formed on parallel lines 16, 17 spaced apart by $\lambda/6$ perpendicular to a central line 15 extended in parallel to the direction in which the magnets 13 are sequentially disposed. These magnetic sensor elements 12a to 12h are formed along parallel lines 24, 25 spaced apart by $\lambda/4$ perpendicular to the central line 15 within the same plane. Accordingly, the magnetic sensor elements 12a and 12g are formed along parallel lines spaced apart by the distance of $(1+(\frac{1}{2}))\lambda$. The above distance is not limited to $(1+(\frac{1}{2}))\lambda$ and the magnetic sensor elements 12a and 12g may be formed along parallel lines spaced apart by $(n+\frac{1}{2}))\lambda$ where n is a positive integer. In that case, the first magnetic reluctance element 18 is extended from the central line 15 to one direction (upper direction in FIG. 6) and has a predetermined length L, whereas the second magnetic reluctance element 19 is extended from the central line 15 to the direction (lower direction in FIG. 6) opposite to the direction in which the first magnetic reluctance element 18 is extended. The first and second magnetic reluctance elements 18 and 19 are connected at their end portions close to each other on the central line 15. In this fashion, the magnetic sensor elements 12a to 12h are each formed substantially as a single magnetic reluctance element pattern.

In the magnetic sensor 14 of this embodiment, the first and second magnetic reluctance elements 18, 19 forming each of the magnetic sensor elements 12a to 12h are disposed so as not to overlap each other, that is, as a straight line as seen from the direction X parallel to the direction in which the magnets 13 are disposed. A dotted portion (not shown in FIG. 7) slightly wider than the pattern width of the magnetic reluctance elements shown in FIG. 6 represents a conductive portion 20 which is formed by a thin film forming technique. The conductive portion 20 is used to prevent a noise signal from being produced. While the magnetic reluctance elements 18, 19 are formed on the surface side which is not opposed to the magnetized scale 10 in FIG. 6 in order to understand the sheet of drawing of FIG. 6 more clearly, in actual practice, the magnetic reluctance elements 18, 19 are disposed on the surface side opposing to the magnetized scale 10, thereby increasing detection sensitivity. This is also true for the sheets of associated drawings.

When the voltage is applied to the thus arranged magnetic sensor 14 (see FIGS. 6 and 7) in the polarities $(+)$ and $(-)$ shown in FIG. 8 which shows a circuit arrangement of the magnetic sensor elements 12a to 12h and when differential amplifiers (not shown) are respectively connected to output terminals 26, 27 and 28, 29, then the differential amplifiers derive detected signals of phase A and phase B which are displaced in phase by 90 degrees and from which an even-numbered order harmonic component and a ternary harmonic component are removed.

According to this embodiment, the magnetic sensor 14 includes the crank-shaped magnetic sensor elements 12a to 12h so that, even when the lattice pitch $\lambda$ of the magnetized scale 10 is further reduced, the first and second magnetic reluctance elements 18 and 19 connected in series can be prevented from being overlapped with each other, which can provide the position detecting apparatus which is high in position detection accuracy.

Figure 9:
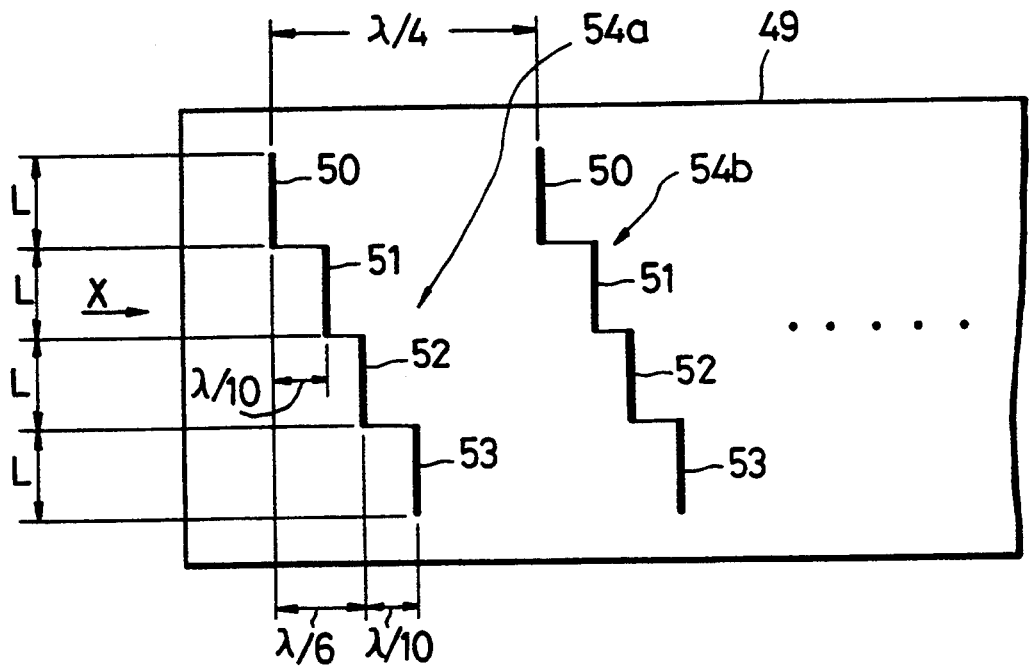
FIG. 9 is a plan view of a second embodiment of the position detecting apparatus according to the present invention.

FIG. 9 shows an arrangement of a second embodiment of the position detecting apparatus according to the present invention.

As shown in FIG. 9, a magnetic sensor 49 is formed such that 8 magnetic sensor elements 54a, 54b, . . . , 54g, each being formed of first to fourth magnetic reluctance elements 50, 51, 52, 53 and 54 of steps-like configurations having the same length L, are sequentially aligned in parallel to one another with a spacing of $\lambda/4$. FIG. 9 shows only two magnetic sensor elements 54a, 54b for simplicity. In this embodiment, the magnetic reluctance elements 51, 53 are formed with a distance of $\lambda/10$ from the magnetic reluctance elements 50, 52 which are spaced apart by a distance of $\lambda/6$. In other words, the second to fourth magnetic reluctance elements 51, 52 and 53 are formed with distances of $\lambda/10$, $\lambda/6$ and $4\lambda/15$ from the first magnetic reluctance element 50 as seen from the direction X parallel to the direction in which the magnet (not shown) is provided. By connecting and driving the thus arranged magnetic sensor 49 similarly to FIG. 8, it is possible to construct the position detecting apparatus which can remove not only the ternary harmonic component and the even-numbered order harmonic component but also the quinary harmonic component. Further, even when the lattice pitch $\lambda$ of the magnetized scale 10 (see FIG. 6) is reduced, the first to fourth magnetic reluctance elements 50, 51, 52 and 53 can be prevented from being overlapped with one another, which can construct the position detecting apparatus which is high in position detection accuracy.

Figure 10:
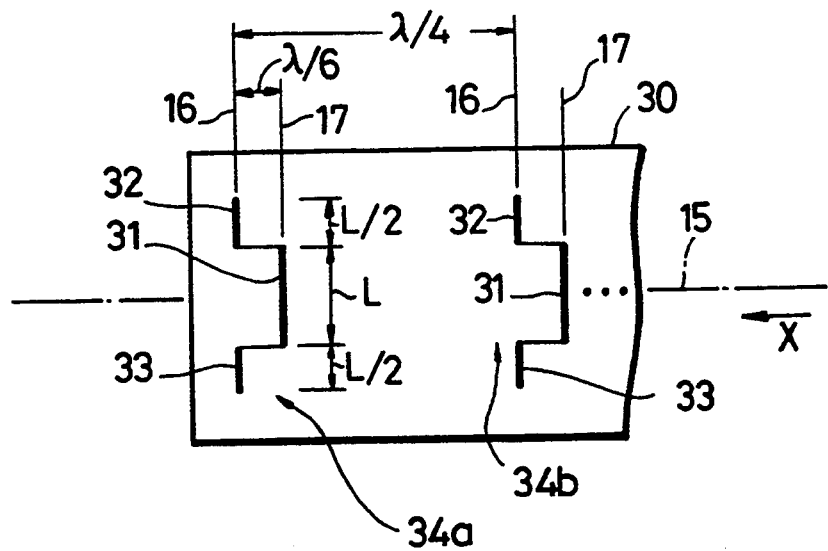
FIG. 10 is a plan view of a third embodiment of the position detecting apparatus according to the present invention.

FIG. 10 shows an arrangement of the third embodiment of the position detecting apparatus according to the present invention. In FIG. 10, like parts corresponding to those of FIG. 7 are marked with the same references and therefore need not be described.

As shown in FIG. 10, a magnetic sensor 30 is formed such that 8 magnetic sensor elements 34a, 34b, . . . each having first to third magnetic reluctance elements 31 to 33 formed on parallel lines 16, 17 having a spacing of $\lambda/6$ extended in the direction perpendicular to the central line 15 within the same plane are aligned in parallel with a spacing of $\lambda/4$ similar to FIG. 7. FIG. 10 shows only two magnetic sensor elements 34a and 34b for simplicity. In that event, as shown in FIG. 10, the first magnetic reluctance element 31 is formed on one line 17 of the parallel lines 16, 17 and extended from the central line 15 to the upper and lower directions so as to have a predetermined length L, whereas the second magnetic reluctance element 32 is formed on the other line 16 of the parallel lines 16, 17 and extended from the central line 15 at its position distant by L/2 in the direction opposite to the central line 15 side so as to have a length of L/2. The third magnetic reluctance element 33 is formed on the other line 16 of the parallel lines 16, 17 so as to become symmetrical to the second magnetic reluctance element 32 with respect to the central line 15. The two ends portions of the first magnetic reluctance element 31 are connected to the second and third magnetic reluctance elements 32 and 33 at their end portions near the central line 15 side.

By connecting and operating the thus arranged magnetic sensor 30 similarly to FIG. 8, it is possible to obtain a detected signal from which the ternary harmonic component and the even-numbered order harmonic component are removed.

Figure 11:
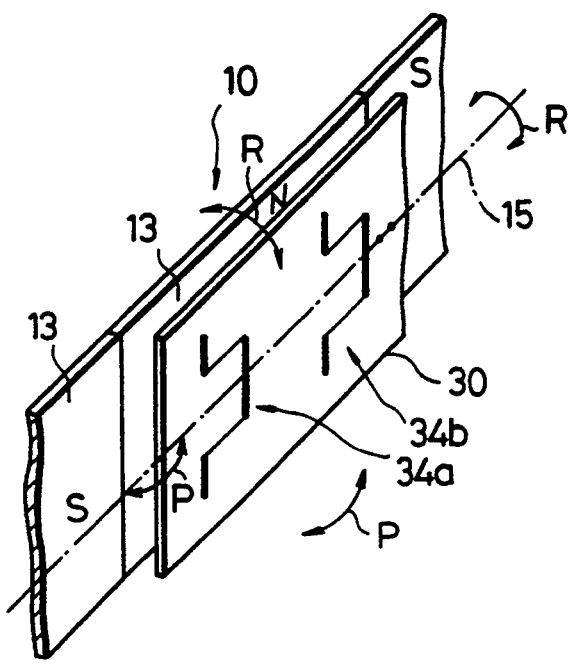

According to this embodiment, the ratio of the lengths of the first to third magnetic reluctance elements 31, 32 and 33 is selected to be 2:1:1. Therefore, it is to be understood from FIG. 11 that, even if the magnetic sensor 30 is inclined to the rolling direction R about the central line 15 to cause the clearance between it and the magnetic scale 10 to be fluctuated, then the signal amplitude of the detected signal is never fluctuated. Further, even if the magnetic sensor 30 is inclined in the pitching direction P of the central line 15, the fluctuation of the amplitude of the detected signal relative to the inclination can be reduced as compared with the prior art because the pattern interval in the central line 15 direction can be reduced.

Figure 12:
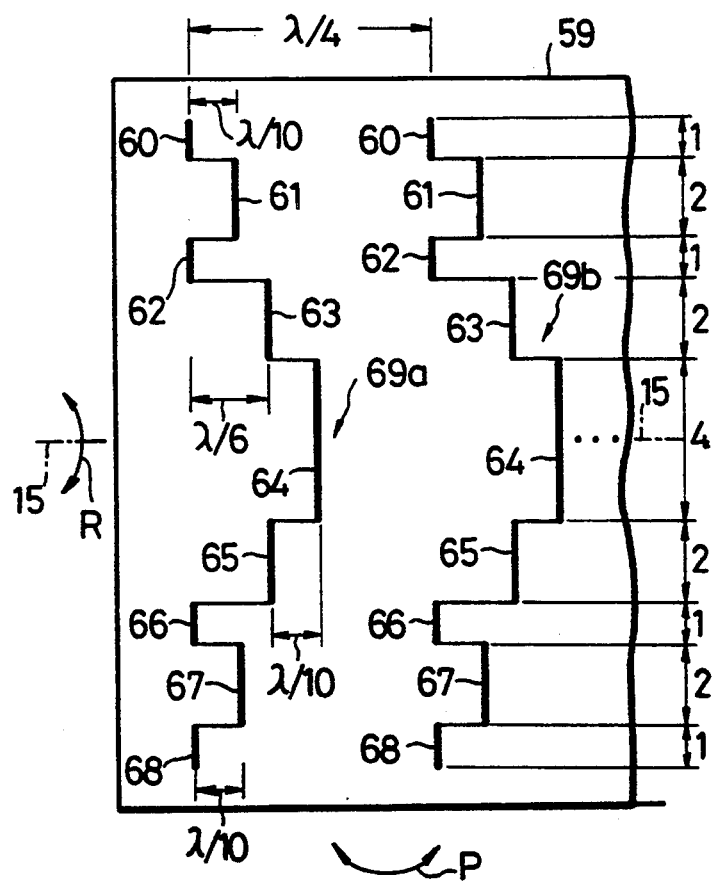
FIG. 12 is a plan view illustrating of the position detecting apparatus according to the present invention.

FIG. 12 shows a fourth embodiment of the position detecting apparatus according to the present invention.

As shown in FIG. 12, a magnetic sensor 59 is composed of 8 magnetic sensor elements 69a, 69b, . . . , each being formed of magnetic reluctance elements 60 to 68, and being spaced apart by $\lambda/4$. In this case, from magnetic reluctance elements 60, 62, 66 and 68 are spaced apart from the magnetic reluctance elements 63, 65 by $\lambda/6$ magnetic reluctance elements 61, 67 and 64 are spaced by $\lambda/10$, respectively. FIG. 12 shows only two magnetic sensor elements 69a and 69b for simplicity but in order to more clearly understand the whole arrangement of the magnetic sensor 59 in this embodiment, FIG. 13B shows an overall arrangement of the magnetic sensor 59 in which eight magnetic sensor elements 69a, 69b, . . . , 69h are illustrated while part of reference numerals is not shown. In that case, the magnetic sensor elements 69a and 69f are formed on the parallel lines spaced apart by $(1+(\frac{1}{3}))\lambda$. If the magnetic sensor 59 having the magnetic sensor elements 69a to 69h constructed as shown in FIG. 13B (FIG. 12) is connected as shown in FIG. 14, applied with a voltage in the polarities of (+) and (−) shown in FIG. 14 and differential amplifiers (not shown) are respectively connected to output terminals 73, 74 and output terminals 75, 76, then the differential amplifiers derive detected signals of phases A and B displaced in phase by 90 degrees and from which the even-numbered order harmonic component and the ternary and quinary harmonic components are removed.

Also in accordance with this embodiment, the ratio of the lengths of the magnetic reluctance elements 60 to 68 constituting the magnetic sensor elements 69a to 69h is selected to be 1:2:1:2:4:2:1:2:1 (see FIG. 12) so that, even if the magnetic sensor 59 is inclined in the rolling direction R of the central line 15, then the signal amplitude of the detected signal can be prevented from being fluctuated. Further, even if the magnetic sensor 59 is inclined in the pitching direction P of the central line 15, then the amplitude fluctuation of the detected signal relative to such inclination can be reduced as compared with the prior art because the pattern interval of the central line direction 15 can be reduced.

In the magnetic sensors 14, 49, 30 and 59 shown in FIGS. 6, 9, 10 and 12, even when each of the magnetic sensor elements 12a, 54a, 34a and 69a is constructed as the single magnetic sensor element and the rest of seven magnetic sensor elements (magnetic sensor elements 12b to 12h and so on) is constructed as a simple resistor (e.g., a metal-deposited fixed resistor), then it is possible to construct the position detecting apparatus which can remove the odd-numbered order harmonic component and the even-numbered order harmonic component.

Figure 15:
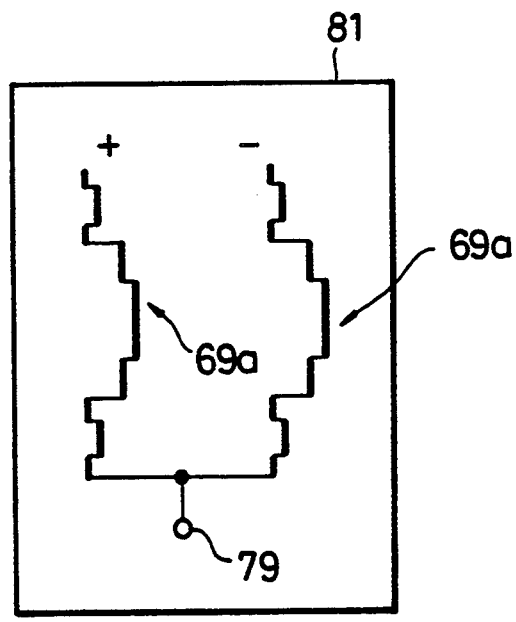
FIGS. 15 and 16 are plan views illustrating a fifth and sixth embodiments of the position detecting apparatus having the above folded pattern according to the present invention.
Figure 16:
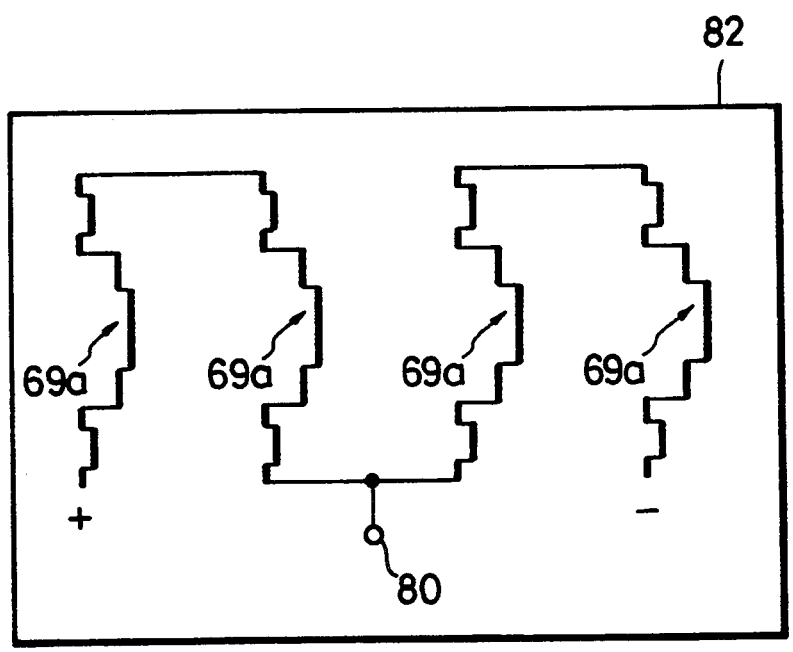

Further, if the magnetic sensor elements 69a shown in FIG. 12 are disposed as shown in FIGS. 15 and 16 and one end portions thereof are connected together to form magnetic sensors 81, 82 of folded patterns having output terminals 79, 80, then it is possible to obtain the position detecting apparatus whose detected signal is superior in mean effect and can be substantially prevented from being affected by the fluctuation of the amplitude of by, for example, the pitching direction from the output terminals 79, 80. With respect to the magnetic sensor element 54a shown in FIG. 9, it is possible to obtain the magnetic sensors constructed as shown in FIGS. 15 and 16.

The thus constructed magnetic sensor is not limited to the detection of position but may be applied to the detection of acceleration.

As is clear from the above embodiments, according to the present invention, since the magnetic sensor element having the first and second magnetic reluctance elements can be substantially regarded as the single pattern, it is possible to obtain the small position detecting apparatus in which the pattern of the magnetic sensor element can be suppressed from being relatively extended in the direction in which the magnets are disposed and which can remove the ternary harmonic component.

Further, according to the present invention, since the magnetic sensor element having the first to third magnetic reluctance elements can be regarded substantially as the single pattern, it is possible to obtain the small position detecting apparatus in which the pattern of the magnetic sensor element can be suppressed from being relatively extended in the direction in which the magnets are disposed and which can remove the ternary and quinary harmonic components.

Furthermore, according to this invention, since the magnetic sensor elements are formed symmetrically with respect to the central line parallel to the direction in which the magnets of the magnetic scale are disposed, even if the magnetic sensor is inclined relative to the central line by a predetermined angle or even if a so-called clearance is fluctuated, then it is possible to obtain the small position detecting apparatus in which the amplitude fluctuations of the detected signals can be cancelled each other out and in which the pattern of the magnetic sensor elements can be suppressed from being relatively extended in the direction in which the magnets are disposed. Also, this small position detecting apparatus can remove the ternary and quinary harmonic components.

In addition, according to the present invention, since a plurality of magnetic sensor elements are formed with a spacing of $\lambda/4$ in the direction in which the magnets of the magnetic scale are disposed, it is possible to obtain the small position detecting apparatus which can remove the even-numbered order harmonic component and the ternary and quinary harmonic components under the condition such that the pattern of the magnetic sensor elements can be suppressed from being extended in the direction in which the magnets are disposed.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A position detecting apparatus comprising:
a magnetic scale formed by sequentially disposing magnets at a lattice pitch $\lambda$; and
a magnetic sensor disposed in an opposing relation to said magnetic scale so as to become relatively movable to each other, wherein said magnetic sensor includes a plurality of magnetic sensor elements, each having first and second magnetic reluctance elements, said first and second magnetic reluctance elements are spaced apart from each other by $\lambda/6$ in the direction in which said magnets are disposed and connected in series, and said first and second magnetic reluctance elements are disposed so as not to overlap each other as seen from the direction parallel to the direction in which said magnets are disposed.

2. A position detecting apparatus comprising:
a magnetic scale formed by sequentially disposing magnets at a lattice pitch $\lambda$; and
a magnetic sensor disposed in an opposing relation to said magnetic scale so as to become relatively movable to each other, wherein said magnetic sensor includes a plurality of magnetic sensor elements, each having first to fourth magnetic reluctance elements, said second to fourth magnetic reluctance elements are respectively spaced apart by $\lambda/10$, $\lambda/6$ and $4\lambda/15$ from said first magnetic reluctance elements and connected in series and said first to fourth magnetic reluctance elements are disposed so as not to overlap each other as seen from the direction parallel to the direction in which said magnets are disposed.

3. A position detecting apparatus according to claim 1 or 2, wherein said plurality of magnetic sensor elements, each having said magnetic reluctance elements disposed so as not to overlap each other, are disposed symmetrically with respect to a central line parallel to the direction in which said magnets are disposed.

4. A position detecting apparatus according to claim 1 or 2, wherein said plurality of magnetic sensor elements, each having the magnetic reluctance elements disposed so as not to overlap each other, are disposed along parallel lines spaced apart by $(n+\frac{1}{2})\lambda$ where n is a positive integer and which are perpendicular to said central line of said magnetic sensor parallel to the direction in which said magnets are disposed.

* * * * *